(12) United States Patent
Wagh et al.

(10) Patent No.: US 11,346,317 B1
(45) Date of Patent: May 31, 2022

(54) IGNITION SYSTEM FOR DUAL MODE IGNITION AND ENGINE HAVING THE SAME

(71) Applicants: HYUNDAI MOTOR COMPANY, Seoul (KR); KIA CORPORATION, Seoul (KR)

(72) Inventors: Mayuri Wagh, Farmington Hills, MI (US); Philip Zoldak, Plymouth, MI (US); Mark Shirley, Albion, MI (US)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/324,287

(22) Filed: May 19, 2021

(51) Int. Cl.
  *F02P 9/00* (2006.01)
(52) U.S. Cl.
  CPC .................................. *F02P 9/002* (2013.01)
(58) Field of Classification Search
  CPC .. F02P 23/04; F02P 9/002; F02P 15/02; F02P 15/08
  USPC .......................... 123/406.53, 143 b, 636, 638
  See application file for complete search history.

(56) References Cited

U.S. PATENT DOCUMENTS

| | | | |
|---|---|---|---|
| 4,144,860 A | 3/1979 | Muranaka et al. | |
| 4,846,129 A * | 7/1989 | Noble | F02P 17/12 123/406.14 |
| 6,295,966 B1 * | 10/2001 | Ishii | F02P 9/005 123/339.11 |
| 6,499,456 B1 * | 12/2002 | Nogi | F02B 31/085 123/295 |
| 6,595,181 B2 | 7/2003 | Najt et al. | |
| 6,796,278 B2 * | 9/2004 | Ryan, III | F02P 15/08 123/143 B |
| 6,953,032 B2 * | 10/2005 | Goede | F02P 15/08 123/606 |
| 8,104,444 B2 * | 1/2012 | Schultz | F02P 9/007 123/143 B |
| 9,482,192 B2 | 11/2016 | Kim | |
| 9,970,407 B2 * | 5/2018 | Idicheria | F02D 13/0261 |
| 10,612,454 B2 | 4/2020 | Bedogni et al. | |
| 2015/0114332 A1 | 4/2015 | Stifel et al. | |

\* cited by examiner

*Primary Examiner* — Hai H Huynh
(74) *Attorney, Agent, or Firm* — Lempia Summerfield Katz LLC

(57) ABSTRACT

An ignition system for an engine of a vehicle, comprising: a spark plug which includes: a central electrode electrically connected to an ignition coil, and a ground electrode, where the spark plug ignites a mixture of fuel and air in a normal mode of the engine; a high speed pulser to ignite the mixture of fuel and air in a lean-burn mode of the engine; a pulser controller to control the high speed pulser to ignite the mixture of fuel and air in the lean-burn mode of the engine; an engine control unit (ECU) that determines the normal and lean-burn modes based on an engine speed and an engine load, and controls the pulser controller and an ignition of the spark plug based on a determined mode among the normal mode and the lean-burn mode.

14 Claims, 10 Drawing Sheets

FIG. 3 "PRIOR ART"

Corona Ignition (Non-Thermal Plasma)

IGNITION SYSTEM FOR DUAL MODE IGNITION AND ENGINE HAVING THE SAME

FIELD

The present disclosure relates to an internal combustion engine having an ignition system for dual mode.

BACKGROUND

The statements in this section merely provide background information related to the present disclosure and may not constitute prior art.

In general, an internal combustion engine introduces fuel and air in a cylinder during an intake stroke, and a mixture of the fuel and air is ignited by a spark generated by a spark plug in a combustion chamber. The combustion chamber is formed by the cylinder, a piston arranged in the cylinder and a cylinder head of the engine.

In particular, the mixture injected into the combustion chamber is compressed during a compression stroke and ignited by the discharge phenomenon of the spark plug. The mixture of the air and fuel burns in the combustion chamber and thus expands against a movable piston that drives a crankshaft such that the engine generates driving power, and a vehicle may run with the driving power from the engine.

The spark plug provided in the internal combustion engine (e.g., a gasoline engine) plays a role of igniting the compressed mixture by spark discharge due to high voltage current generated from an ignition coil.

In the case of a general gasoline engine, it is mainly operated to combust with a theoretical air/fuel ratio (14.7:1, $\lambda$=1). However, in the case of an engine to implement lean burn combustion defined by lambda greater than one ($\lambda$>1), the air/fuel ratio may be approximately 30:1 ($\lambda$=2). In this case, the mixture in the combustion chamber has very little injected fuel compared to the amount of air, so even if the spark discharge occurs by the spark plug, the mixture does not ignite (e.g., misfire), or an incomplete combustion occurs.

Therefore, it has been required research and development on spark plugs to implement lean combustion.

We have discovered that because of the lean fuel and air ratio in the mixture, it is difficult to achieve consistent, complete and thorough combustion within the main combustion chamber because of the relatively slow rate of flame propagation.

SUMMARY

The present disclosure provides a dual-mode ignition system to enable an internal combustion (IC) engine to operate using a high speed pulse (HSP) at low engine loads with lean conditions (Lambda>1.4, lean burn mode) and the conventional spark plug at high load conditions under normal mode (stoichiometric to rich operation (Lambda<=1)), taking advantage of the performance advantage of conventional spark at high load and extending the ignition stability limits for lean fuel-air mixture at low load, and thus improves the overall engine thermal efficiency and performance across the entire operating range.

In one form of the present disclosure, an ignition system for an engine, includes: a spark plug that includes a central electrode electrically connected to an ignition coil, and a ground electrode, wherein the spark plug configured to ignite a mixture of fuel and air in a normal mode of the engine; a high speed pulser configured to ignite the mixture of fuel and air in a lean-burn mode of the engine, wherein in the lean-burn mode, the mixture of fuel and air is mixed at a lean air/fuel ratio; a pulser controller configured to control the high speed pulser to ignite the mixture of fuel and air in the lean-burn mode of the engine; an engine control unit (ECU) configured to: determine the normal and lean-burn modes based on an engine speed and an engine load and control the pulser controller and an ignition of the spark plug based on a determined mode among the normal mode and the lean-burn mode.

In another form, the spark plug and the high speed pulser are both disposed in a cylinder of the engine and configured to ignite the mixture of fuel and air, the mixture of fuel and air with the lean air/fuel ratio and/or exhaust gas residuals in a combustion chamber of the cylinder, based on the determined mode.

The high speed pulser is configured to generate a non-thermal plasma in the combustion chamber and promote multi-point volumetric combustion in the lean-burn mode.

In one form, the ECU can determine, based on the engine speed and the engine load, a regeneration mode in which power generated by the engine is at least partially used to charge a battery of the vehicle, and an electric vehicle (EV) mode in which the vehicle is run with only an electric power supplied from the battery. In particular, the ECU is further configured to control the high speed pulser controller to inhibit the ignition in the regeneration mode and the EV mode.

In another form, the high speed pulser is configured to discharge at least more than 40,000 voltage pulsed power in less than 100 nano-seconds.

The normal mode includes a cold start of the engine and a middle to a high engine load, which operate by combusting the mixture of fuel and air with a lower ratio than the lean air/fuel ratio.

In another form of the present disclosure, an engine may include: an engine block defining a cylinder; a cylinder head configured to cover the cylinder; a combustion chamber defined at least partially by the cylinder of the engine block and the cylinder head; a fuel delivery system including a high pressure direct injector and/or a low pressure fuel injector in the intake port, or a direct injector into the combustion chamber; an ignition system including: a spark plug configured to ignite a mixture of fuel and air in a normal mode of the engine, and a high speed pulser configured to ignite the mixture of fuel and air in a lean-burn mode of the engine, wherein in the lean-burn mode; a piston reciprocally disposed within the cylinder and configured to move upward to compress the mixture of fuel and air during a compression stroke of the engine; and an engine control unit (ECU) configured to: determine the normal and lean-burn modes based on an engine speed and an engine load, and control the high speed pulser and the spark plug based on a determined mode among the normal mode and the lean-burn mode.

In one form, the spark plug and the high speed pulser are both exposed to the combustion chamber and configured to respectively ignite the mixture of fuel and air, and the mixture of fuel and air having the lean air/fuel ratio in the combustion chamber.

In another form of the present disclosure, a method for controlling combustion in a lean-burn engine, includes: providing the lean-burn engine including a combustion chamber, the combustion chamber having a spark igniter and a high speed pulser; providing a mixture of fuel and air to the combustion chamber in a normal engine mode in which the lean-burn engine operates with spark ignition at middle and high engine loads utilizing the spark igniter, providing a lean air/fuel mixture to the combustion chamber in a lean-burn engine mode in which the lean-burn engine operates with a multipoint volumetric combustion in the combustion chamber utilizing the high speed pulser; and in the lean-burn engine mode, igniting the lean air/fuel mixture by the high speed pulser to generate a non-thermal plasma in the combustion chamber and promote multi point volumetric combustion of the lean air/fuel mixture. In particular, the lean air/fuel mixture has a Lambda ($\lambda$) value greater than 1.4.

In another form, the method further includes: determining the lean-burn engine mode when the lean-burn engine operates at a low engine load; determining the normal engine mode when the lean-burn engine operates in a range of the middle to high engine loads; and transitioning from the lean-burn engine mode to the normal engine mode upon receiving an acceleration input.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
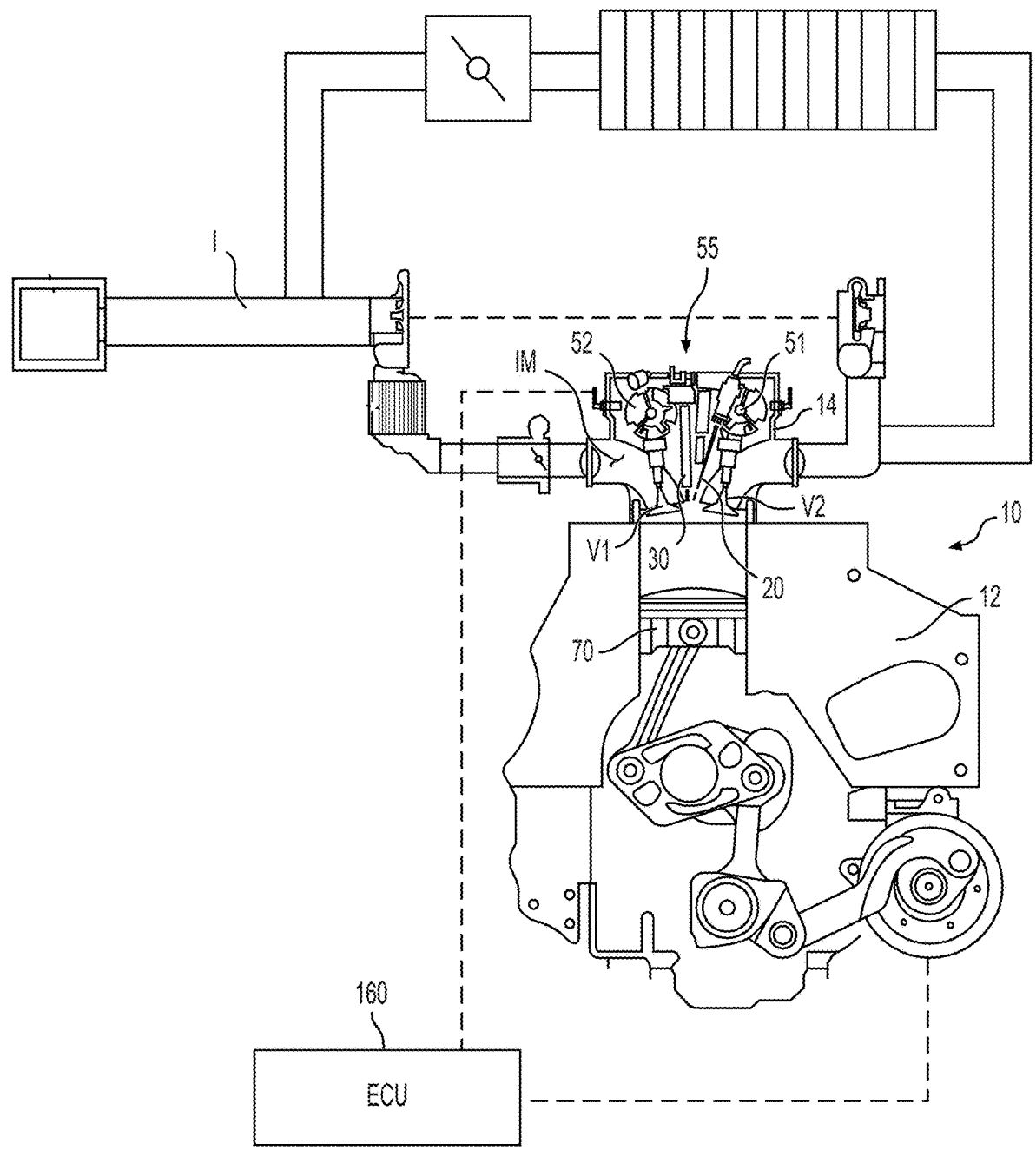
FIG. 1 is an exemplary diagram illustrating an engine having an ignition system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

This present disclosure does not describe all components of forms, and general information in the technical field to which the present disclosure belongs or overlapping information between the forms will not be described.

It will be understood that, although the terms first, second, third, etc. may be used herein to describe various components, these components should not be limited by these terms. These terms are only used to distinguish one component from another.

Reference numerals used in operations are provided for convenience of description, without describing the order of the operations, and the operations can be executed in a different order from the stated order unless a specific order is definitely specified in the context.

Hereinafter, the operation principle and exemplary forms of the present disclosure will be described with reference to the accompanying drawings. As publicly known in the art, some of exemplary forms may be illustrated in the accompanying drawings from the viewpoint of function blocks, units and/or modules. Those skilled in the art will understand that such blocks, controllers, units and/or modules are physically implemented by electronic (or optical) circuits such as logic circuits, discrete components, processors, hard wired circuits, memory devices and wiring connections.

When the blocks, units and/or modules are implemented by processors or other similar hardware, the blocks, units and modules may be programmed and controlled through software (for example, codes) in order to perform various functions discussed in this specification. Furthermore, each of the blocks, units, controllers, and/or modules may be implemented by dedicated hardware or a combination of dedicated hardware for performing some functions and a processor for performing another function (for example, one or more programmed processors and related circuits).

In one aspect, referring to FIG. 1, the present disclosure provides an engine 10 having an ignition system 20 capable of improving ignitability of lean fuel-air mixtures using a spark plug 40 to ignite a mixture of fuel and air in a normal mode of the engine and a high speed pulser (HSP) 60 to ignite the lean fuel-air mixtures in a lean-burn mode of the engine. The engine 10 includes an engine control unit (ECU) 160 that determines whether an operation of the engine is in the lean-burn mode or the normal mode based on an engine load and an engine speed (i.e., revolutions per minute "RPM").

In the lean-burn mode, the mixture of fuel and air is mixed at a lean air/fuel ratio, for example, a Lambda ($\lambda$) value having greater than 1.4. Here, the normal mode of the engine is defined as operating the engine with the mixture of fuel and air having the Lambda ($\lambda$) value that is equal to less than 1.4.

Referring to FIG. 1, in one form of the present disclosure, the engine 10 further includes: a cylinder block 12; a cylinder head 14 disposed on the cylinder block 12; an injector 30 installed on the cylinder head; and a piston 70 reciprocally movable in each cylinder 90 of the engine. The ignition system 20 having the spark plug 40 and the high speed pulser (HSP) 60 are installed on the cylinder head 14, and the injector 30 may be located between an intake valve V1 and an exhaust valve V2.

In another form, the engine 10 may further include: a valve control device 55 to vary operation timings (e.g., opening and closing timings), and an opening duration of each of the intake valve and the exhaust valve which are provided on an upper portion of the cylinder, and an exhaust-gas recirculation (EGR) valve 56 to circulate an exhaust gas from an exhaust pipe. The exhaust gas is discharged from the engine 10 through the exhaust pipe to an intake pipe "I". In one form, the valve control device 55 may include: continuous variable valve timing (CVVT) devices 51, 52 to adjust the opening and closing timings of the intake valve or the exhaust valve; and a continuously variable valve duration (CWD) to adjust an opening duration of the intake and exhaust valves.

Figure 2:
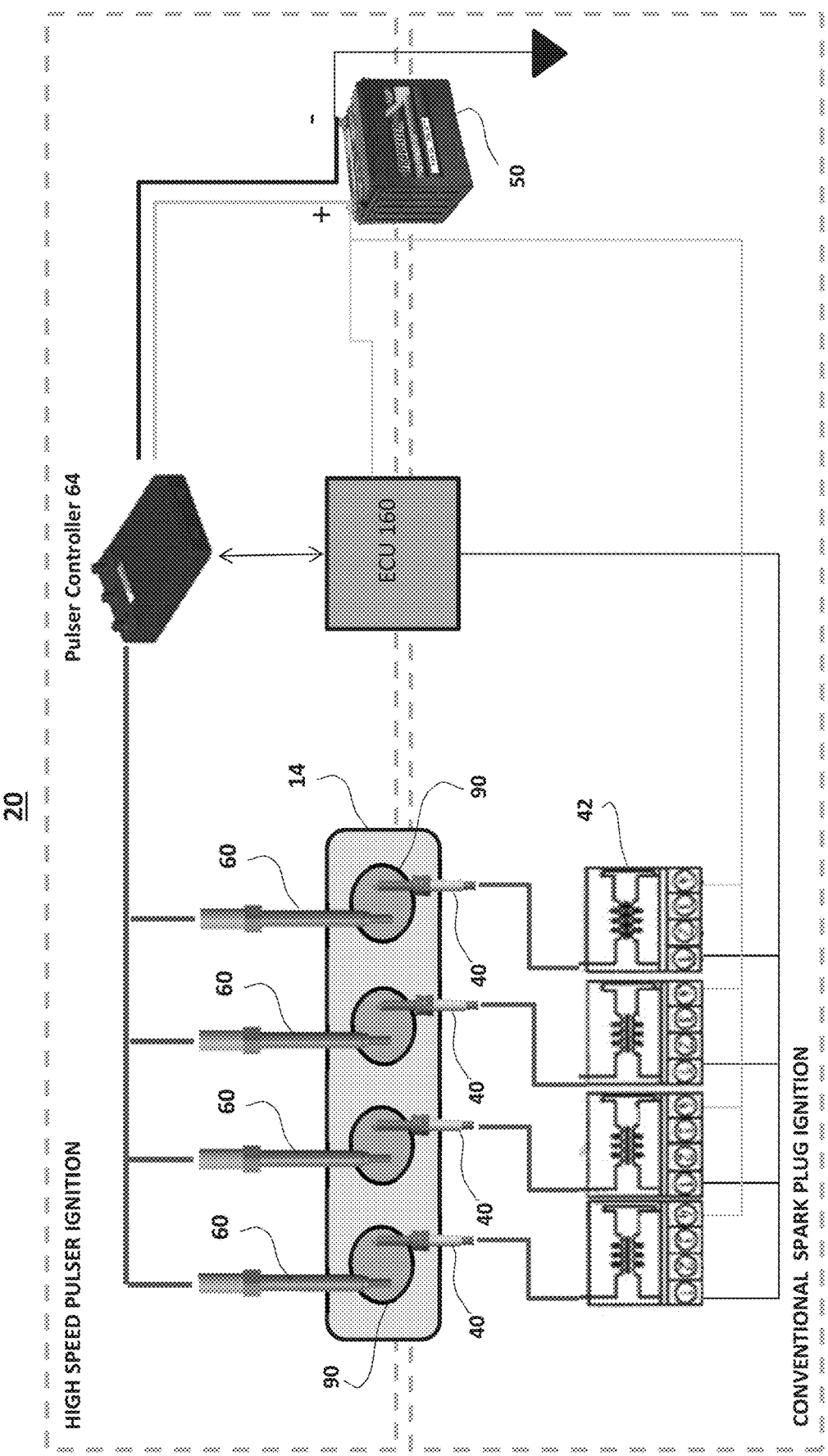
FIG. 2 is an electrical diagram of an ignition system implementing dual mode ignition in one form of the present disclosure.

FIG. 2 illustrates an electrical diagram of the ignition system 20 implementing the dual mode ignition (i.e., ignition in the normal mode and the lean-burn mode) utilizing the HSP 60 and the spark plug 40. The ignition system 20 applicable to the engine 10 may further include: a pulser controller 64 to control the HSP 60 to ignite the lean fuel-air mixture in the lean-burn mode of the engine; and the engine control unit (ECU) 160 which determines the normal and lean-burn modes based on the engine speed and the engine load, and controls the pulser controller 64 and an ignition of the spark plug 40 based on a determined mode among the normal mode and the lean-burn mode.

As shown in FIG. 2, a pair of the spark plug 40 and the HSP 60 are arranged in each cylinder 90 of the engine 10, and the pulser controller 64 communicates with the ECU 160 and controls each HSP 60 based on an input from the ECU 160 that determines whether the engine operates in the normal mode or the lean burn mode based on the engine speed and the engine load. Similarly, the ECU 160 controls the ignition coils 42 to control the ignition timing of the spark plugs 40 in each cylinder of the engine based on engine operation conditions, including the engine speed and engine load, determined by the ECU. A battery 50 of the vehicle may supply electric power to the ignition system 20 including the HSP 60, the ignition coil 42, the ECU 160, and the pulser controller 64.

Figure 3:
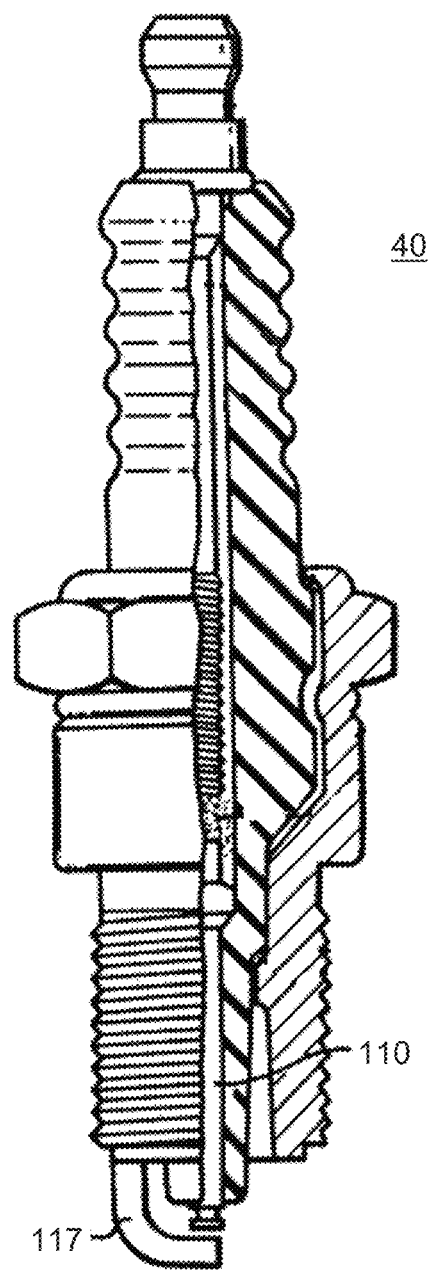
FIG. 3 is a view showing an overall construction of a spark plug in one form of the present disclosure.

In one form, as illustrated in FIG. 3, the spark plug 40 is a conventional spark plug that includes a central electrode 110 electrically connected to the ignition coil or ignition module 42, and a ground electrode 117 which forms a spark gap with a distal end of the central electrode 110. When the battery 50 supplies the electric power to the ignition coil 42, the ignition coil 42 generates an ignition voltage under control of the ECU 160. The spark plug 40 generates a spark discharge by the ignition voltage applied to the spark plug. In one form, the central electrode 110 of the spark plug 40 is made of base metal (e.g. Ni—Cu) having heat resistance, corrosion resistance and electrical conductivity, and the distal end portion of the central electrode 110 serves as a spark portion.

Figure 4:
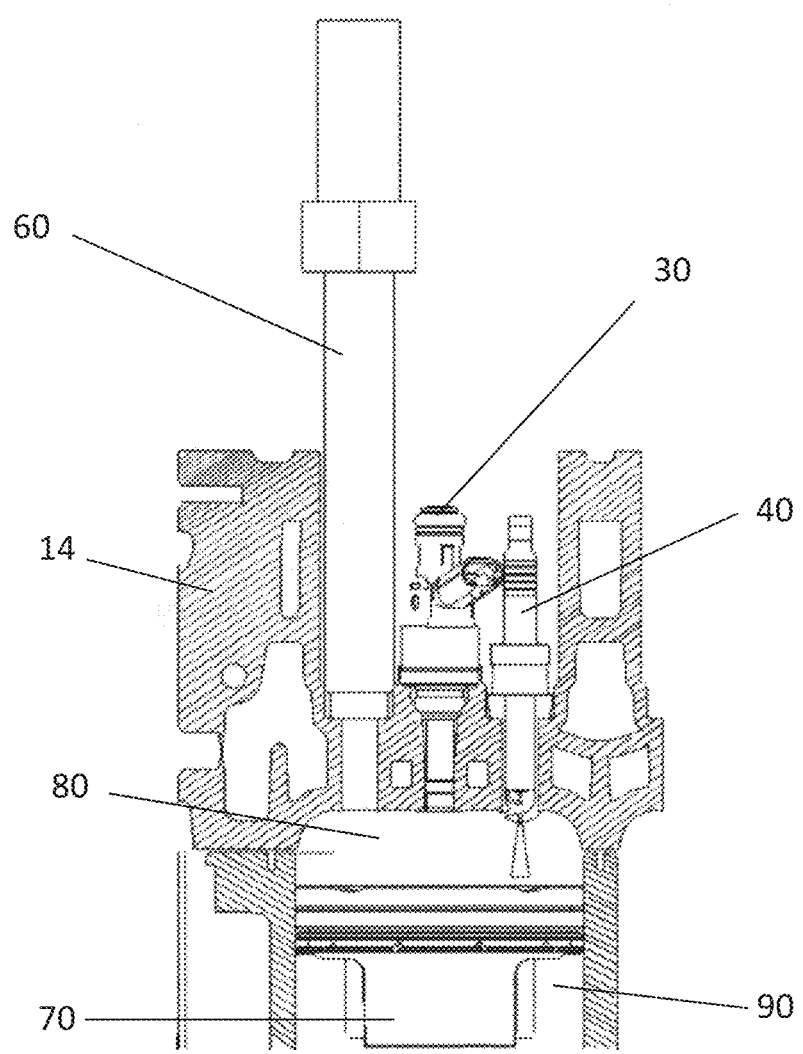
FIG. 4 is an enlarged partial cross-sectional side view of FIG. 1, illustrating an arrangement of an injector, a spark plug, and a high speed pulser in a cylinder head.

FIG. 4 is an enlarged partial cross-sectional side view of FIG. 1, illustrating an arrangement of the injector 30, the spark plug 40, the high speed pulser (HSP) 60, the intake valve V1, and the exhaust valve V2 in the cylinder head 14. The spark plug 40 and the high speed pulser 60 are both disposed in the cylinder 90 of the engine and configured to ignite the mixture of fuel and air in a combustion chamber 80 in the cylinder 90. As illustrated in FIG. 4, the combustion chamber 80 is defined at least partially by the cylinder 90 and the cylinder head 14.

In another form, the injector 30 may be located above a central portion of an upper surface of the piston 70, and the injector 30 is connected to a fuel pump which pressurizes fuel with a predetermined magnitude and directly supplies the pressurized fuel in the cylinder (namely, a direct injector). In another form, the injector 30 may be located in an intake port (namely, a port injector) in communication with an intake manifold "IM". An injection pattern of the injector 30 is varied through a duty control, and the injector 30 performs fuel injection at least once during an intake stroke, selectively performs the fuel injection during a compression stroke, and injects fuel immediately before or simultaneously with an operation of the spark plug 40 or the HSP 60 during an explosion stroke of the engine.

As the fuel is injected immediately before or simultaneously with the operation of the spark plug 40 or the HSP 60 during the explosion stroke, a mixing ratio of fuel and air around the spark plug 40 and the HSP 60 may be rich or lean according to the amount of the injected fuel by the injector 30. Not only the mixing ratio but also a type of an igniter (i.e., the spark plug or the HSP) affects a formation of an initial flame and a flame diffusion in combusting the mixed fuel and air in the combustion chamber 80. In particular, the ECU 160 determines a normal mode and a lean-burn mode based on an engine speed (e.g., revolutions per minute "RPM") and an engine load, and controls the spark plug 40 and the HSP 60 based on a determined mode among the normal mode and the lean-burn mode such that the engine consumes less fuel and operates efficiently.

As described above, the engine control unit (ECU) 160 controls the spark plug 40, the HSP 60, the valve control device 55, and the injector 30. The ECU 160 controls the injector 30 to control an injection timing and an amount of fuel so that the fuel-air mixture in the cylinder 90 may be selected to be at stoichiometry, a value rich of stoichiometry or a value lean of stoichiometry. Here, the ECU controlling the engine may be embodied in a hardware manner (e.g., a processor), a software manner, or a combination of the hardware and the software manner (i.e., a series of commands), which processes at least one function or operation. The ECU receives various signals indicative of operation conditions of the engine from various sensors coupled to the engine, including the engine speed (RPM) signal of the engine, and engine loads corresponding to an engine torque required to meet a desired output of the engine to run the vehicle.

Figure 5:
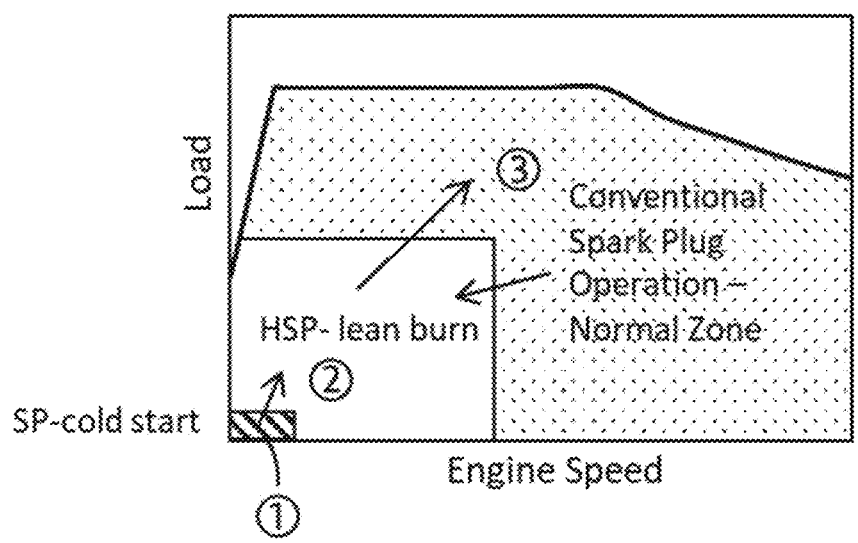
FIG. 5 is a schematic graph illustrating operation conditions of an engine in one form of the present disclosure.

FIG. 5 is a schematic graph illustrating operation conditions of an engine in one form of the present disclosure. The engine load-engine speed diagram shows a "SP-cold start" region ①, a "HSP-lean burn" region (i.e., the lean-burn mode) ②, and a "conventional spark plug" region ③ (i.e., the normal mode). In the SP-cold start" region ①, the ECU 160 controls the electric current supplied to the ignition coil 42 for the spark plug 40 to generate a spark discharge by the ignition voltage applied to the spark plug. The ECU 160 determines that the engine is in the cold start state when the engine starts from shutdown, an engine temperature is below a threshold and a catalyst temperature is below a threshold. This cold start state is different from an engine hot start state such as an engine restart wherein the engine is restarted soon after a preceding engine shutdown such that an engine temperature and/or a catalyst temperature is above a threshold. Based on the operation conditions of the engine, the ECU determines the transitions between the above-discussed regions as the arrows indicate in FIG. 5.

When an acceleration input is received, the engine operation moves to the the "HSP-lean burn" region (i.e., the lean-burn mode) ②. In the "HSP-lean burn" region (i.e., the lean-burn mode) ②, the ECU 160 electrically communicates with the pulser controller 64 and controls each HSP 60 based on an input from the ECU 160 when it determines that the engine is operating in the lean burn mode based on the engine speed and the engine load. When the engine operates at a low speed (800 RPM-1500 RPM) or a middle speed (1500 RPM-2500 RPM) and the engine load is in a low range (2 bar-8 bar Brake Mean Effective Pressure), the engine may not require a high torque to run the vehicle and may operate in the lean-burn mode to improve the fuel efficiency. However, when the conventional spark plug is used to ignite the lean fuel-air mixture, for example, having Lambda (λ) value greater than 1.4, the engine has difficulties in igniting the lean fuel-air mixture.

As discussed above, the present disclosure provides the HSP 60 to ignite the lean fuel-air mixture in the lean-burn mode such that the engine implements the dual-mode ignition system, utilizing both a novel high speed pulser ignition system (low-loads) and a conventional spark plug 40. The HSP 60 is a non-thermal high speed pulser that produces a high voltage nanosecond pulse that is low in overall energy. The HSP 60 creates a highly efficient non-thermal ignition process for enabling lean-burn (Lambda>1.4) combustion engines.

Figure 6:
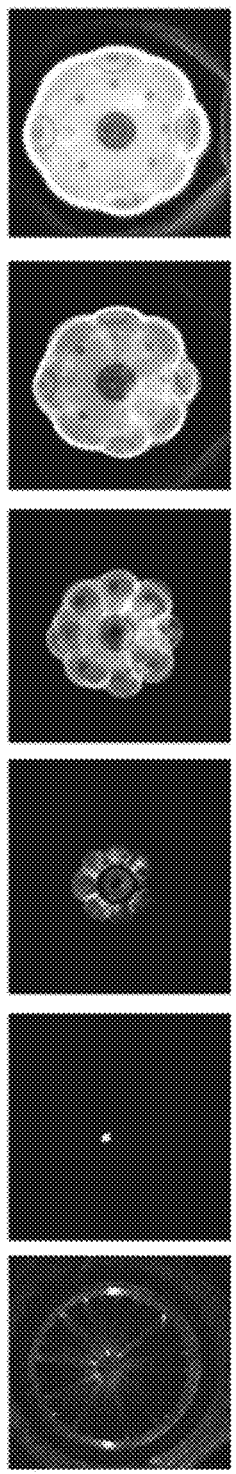
FIG. 6 illustrates a non-thermal plasma generated by a high speed pulser in one form of the present disclosure.

More specifically, the high speed pulser 60 generates a non-thermal plasma in the combustion chamber and promotes multi point volumetric combustion in the lean-burn mode. FIG. 6 illustrates a non-thermal plasma generated by a high speed pulser in one form of the present disclosure. The initial flame kernel is formed in a ring shape around central electrode and is developed faster than the spark plug. In particular, the HSP 60 discharges electrons which impact fuel or air molecules and create free radicals which are the precursor to a flame ignition kernel. The HSP 60 employs electrical discharges/non-thermal plasmas in a gaseous medium to activate the fuel derived from the fuel injector to promote more effective and efficient combustion. In non-thermal plasmas, the electrons are 'hot', while the ions and neutral species are 'cold'—which results in little waste enthalpy being deposited in a process gas stream. This is in contrast to thermal plasmas, where the electron, ion, and neutral-species energies are in thermal equilibrium (or 'hot') and considerable waste heat is deposited in the process gas.

The basic working principle of the non-thermal plasma is electrons collide with the gas producing chemically reactive species which catalyze the combustion process, enhancing ignition and stabilizing lean burn combustion. A single non-thermal transient plasma discharge in air favorably alters pre-combustion chemistry and physics.

The HSP 60 discharges at least more than 40,000 volts pulsed power in less than 100 nano-seconds. The HSP 60 is a multipoint ignition source which helps to burn the mixture in the combustion chamber more effectively and can ignite very lean mixture (lambda>1.4) conditions. In other words, the HSP 60 provides higher energy than the conventional spark plug to ignite lean fuel-air mixtures inside the combustion chamber during the low load operation common in most vehicle drive cycles. As such, the HSP ignition technology extends ignition stability limits and the engine can be operated with 20% greater efficiency and more than 50% less NOx emissions. The extended ignition stability in the lean fuel-air mixtures also contributes to better fuel economy and ultra-low engine out NOx emissions and particulate emissions.

Although the HSP 60 improves lean limit extension for lean burn combustion at low load conditions (e.g., the lean-burn mode), it is not effective at high load conditions (e.g., the normal mode). Therefore a conventional spark plug 40 is utilized for the high load condition. For example, when the engine load gets higher in response to the increase in the engine torque and/or the engine speed increases, the ECU 160 controls the injector 30 to increase an amount of the fuel and thus the mixture of the fuel and air gets rich, for example, the mixture having Lambda value less than 1.4. Then, the ECU determines that the engine operates in the normal mode (i.e., "conventional Spark plug" region ③) and stops the operation of the HSP 60 and uses the spark plug 40 to ignite the mixture fuel and air in the normal mode.

As described above, the present disclosure provides the dual mode ignition system to enable the internal combustion (IC) engine to operate using the HSP at low loads with lean conditions (Lambda>1.4), and to operate with the conventional spark plug at high load conditions which is under rich to lean conditions (0.9<Lambda<1.4), thereby making the engine capable of operating with the dual mode ignition function in its most efficient air fuel mixture depending on speed and load conditions of the engine.

Figure 7:
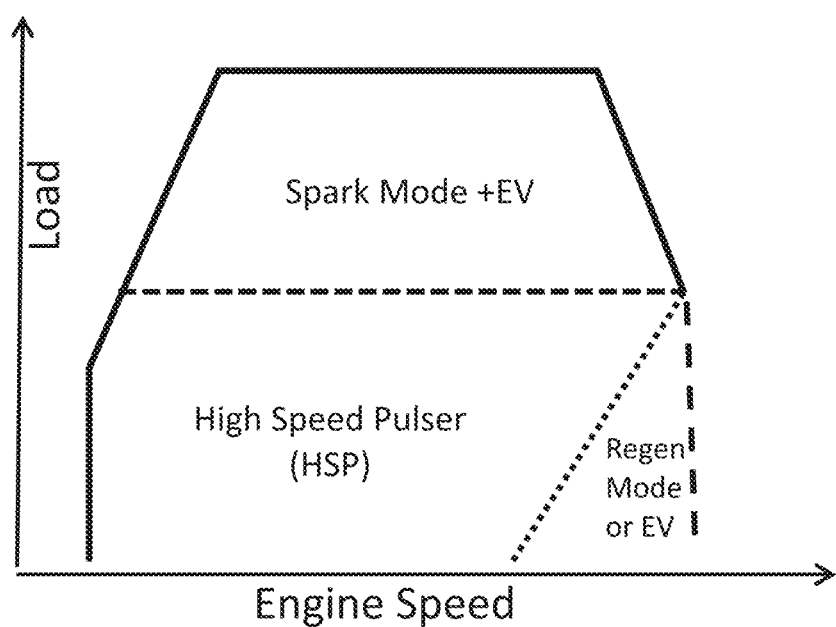
FIG. 7 is a schematic graph illustrating operation conditions of an engine for a hybrid electric vehicle in one form of the present disclosure.

In another form, the engine 10 including the ignition system 20 may be used for a hybrid electric vehicle (HEV) having an electric motor capable of driving the vehicle while the engine 10 stops. In general, the HEV provides various modes including: an electric-only mode (EV mode) in which the HEV allows the vehicle to operate using the electric motor alone, while not using the engine, a hybrid mode in which the engine and the electric motor are both used, and a regeneration mode in which the electric motor is operated as a generator to charge the battery using power of the engine when a braking signal is received by the ECU. In the regeneration mode and the EV mode, the ECU controls the pulser controller to inhibit the ignition of the HSP 60. FIG. 7 is a schematic graph illustrating operation conditions of the engine for HEV. When the engine is operating at 2 bar-8 bar brake mean effective pressure and 800 RPM-2500 RPM, high speed pulser mode is effective mode for combustion. When transitioning from HSP to SP+EV mode (e.g., at higher loads than 8 bar at 800 RPM-5000 RPM), EV motor is turned ON.

Figure 8:
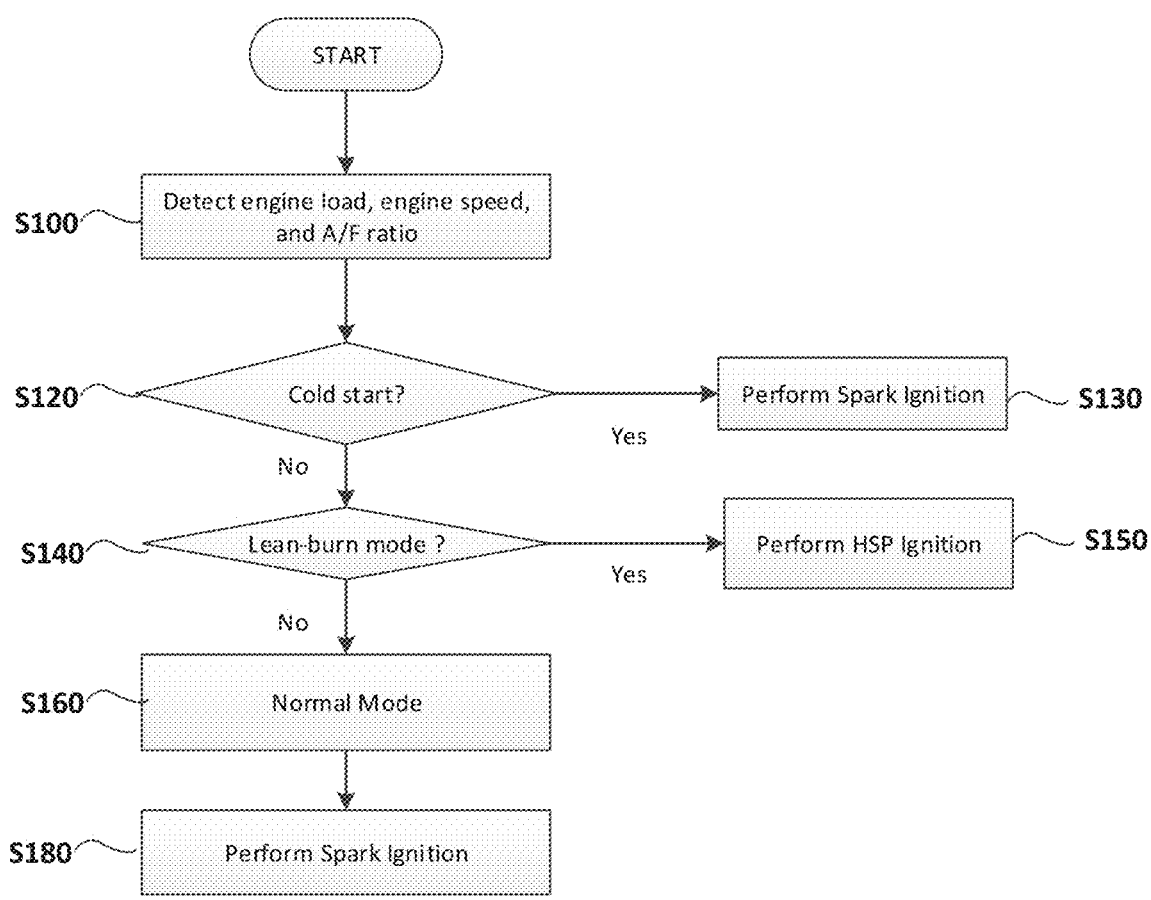
FIG. 8 is a flowchart illustrating a method for controlling dual mode ignition for a lean-burn engine in one form of the present disclosure.

FIG. 8 is a flowchart illustrating a method for controlling dual mode ignition for a lean-burn engine in one form of the present disclosure. As described above, the present disclosure is directed to the lean-burn engine 10 which operates in the lean-burn mode or the normal mode based on the operation condition of the engine. The lean-burn engine 10 improves ignitability of lean fuel-air mixtures by selectively using a spark igniter (e.g., the spark plug) 40 to ignite a mixture of fuel and air charged in the combustion chamber in the normal mode, or the high speed pulser (HSP) 60 to ignite the lean fuel-air mixtures in the lean-burn mode of the engine.

Referring to FIG. 8, at step S100, the ECU 160 detects the engine load corresponding to a required engine torque, engine speed (e.g., engine RPM) and an air/fuel ratio. At step S120, the ECU 160 determines if the engine performs the cold-start. When the cold start is determined, the ECU controls the spark plug to ignite the air/fuel mixture to start the engine. However, when it is determined that the engine is in the cold-start state, the ECU determines if the engine is in the lean-burn mode based on the detected A/F ratio, engine load and engine RPM at step S140. Once the lean-burn mode is determined at step S140, the ECU 160 performs the high speed pulser (HSP) ignition by the HSP 60 that ignites the lean fuel-air mixture. When the engine does not operate in the lean-burn mode, the ECU determines that the engine is in the normal mode (at step S160) and operates, at step S180, the spark plug to ignite the air/fuel mixture in the combustion chamber of the engine. In particular, the ECU 160 determines the lean-burn mode when the lean-burn engine operates at a low engine load, and the normal engine mode when the lean-burn engine operates in a range of middle to high engine loads such as 2 bar-8 bar at 800 RPM-2500 RPM. When an acceleration input is received, the lean-burn engine mode is changed to the normal engine mode.

Figure 9:
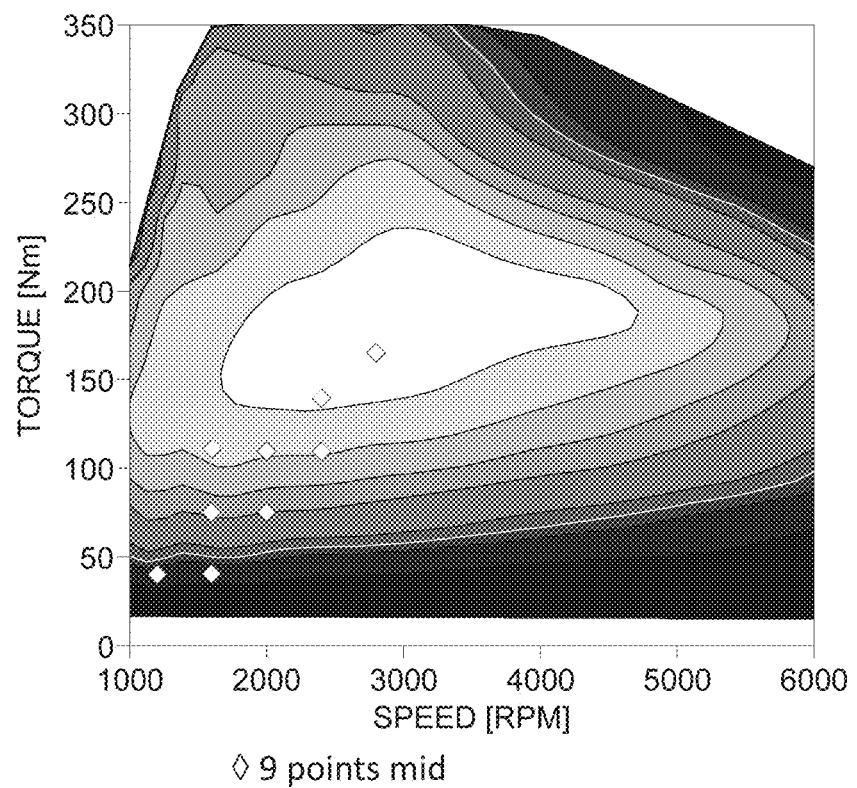
FIGS. 9 and 10 are graphs respectively illustrating improvement in fuel efficiency through an ignition system in one form of the present disclosure.
Figure 10:
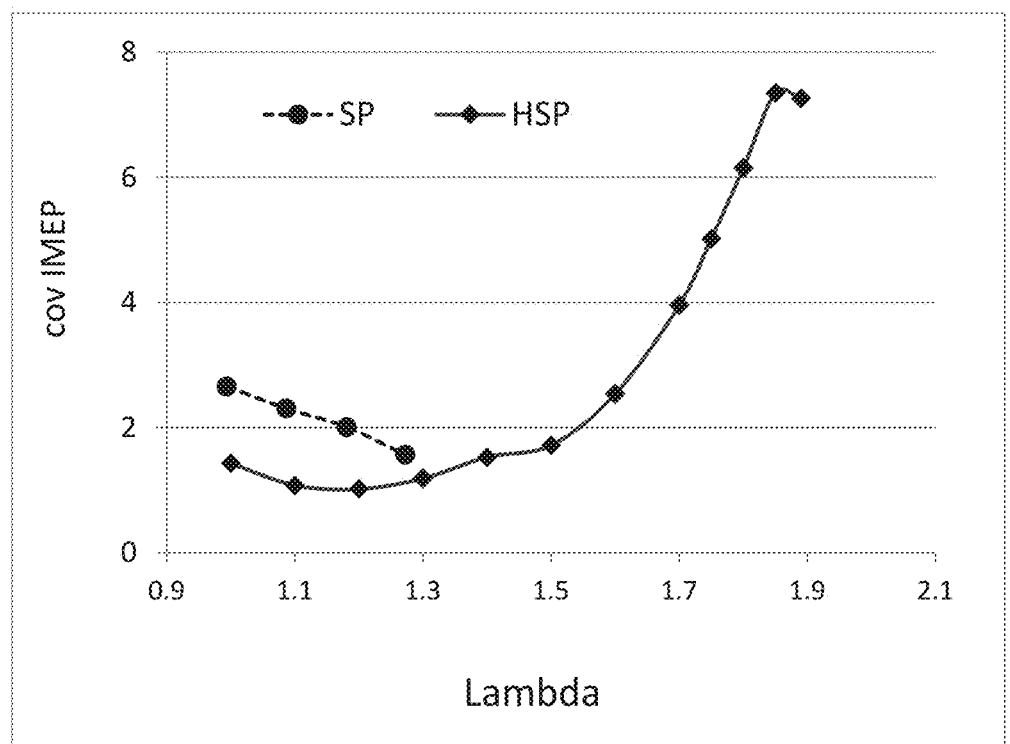

As illustrated in FIGS. 9-10, the dual mode ignition system and the control method thereof maximizes the combustion stability of the lean burn engine in the low load area and utilizes low-cost conventional plug technology in the middle to high engine load areas. The dual mode ignition system and control method result in a 9.4% fuel efficiency (FE) improvement in the brake specific fuel consumption ("BSFC") over the 9Pt representing the FTP75 cycle as shown in FIG. 9. FIG. 9 represents Brake Specific Fuel Consumption rate on a full engine operation map. 9 points are considered as a standard criteria for comparing fuel economy of different engines of similar size. These points are covered in FTP75 cycle.

FIG. 10 is a graph illustrating a coefficient variance of Indicated Mean Effective Pressure of a spark plug and a high speed pulser (HSP) with respect to the change in Lambda values. In FIG. 10, "cov" stands for "Coefficient of variance," "IMEP" means "Indicated Mean effective pressure," and "BMEP" means brake mean effective pressure. The cov of IMEP defines the cyclic variability in indicated work per cycle. As shown in FIG. 10, the conventional spark plug ignition shows better cov_IMEP when the Lambda is less than around 1.3 ($\lambda$<1.4), whereas the HSP ignition has shown better cov_IMEP when the Lambda is greater than around 1.4 ($\lambda$>1.4). As such, the HSP ignition at lean Lambda conditions carry out better combustion stability compared to spark plug ignition.

As described above with reference to the exemplary forms of the present disclosure, the dual mode ignition system and control method contribute to the improvement in fuel economy and provides improved emission control with low cost.

Although a few forms of the present disclosure have been shown and described above, it would be appreciated by those skilled in the art that changes may be made in these forms without departing from the principles and spirit of the disclosure.

What is claimed is:

1. An ignition system for an engine of a vehicle, comprising:
   a spark plug including: a central electrode electrically connected to an ignition coil, and a ground electrode, the spark plug configured to ignite a mixture of fuel and air in a normal mode of the engine;
   a high speed pulser configured to ignite the mixture of fuel and air in a lean-burn mode of the engine, wherein in the lean-burn mode, the mixture of fuel and air is mixed at a lean air/fuel ratio;
   a pulser controller configured to control the high speed pulser to ignite the mixture of fuel and air in the lean-burn mode of the engine; and
   an engine control unit (ECU) configured to:
      determine the normal and lean-burn modes based on an engine speed and an engine load, and
      control the pulser controller and an ignition of the spark plug based on a determined mode among the normal mode and the lean-burn mode.

2. The ignition system of claim 1, wherein the spark plug and the high speed pulser are both disposed in a cylinder of the engine and configured to ignite the mixture of fuel and air and the mixture of fuel and air with the lean air/fuel ratio in a combustion chamber of the cylinder based on the determined mode.

3. The ignition system of claim 2, wherein the high speed pulser is configured to generate a non-thermal plasma in the combustion chamber and promote multi point volumetric combustion in the lean-burn mode.

4. The ignition system of claim 2, wherein the ECU is further configured to determine, based on the engine speed and the engine load, a regeneration mode in which power generated by the engine is at least partially used to charge a battery of the vehicle, and an electric vehicle (EV) mode in which the vehicle is run with only an electric power supplied from the battery, and
   wherein the ECU is further configured to control the pulser controller to inhibit the ignition of the high speed pulser in the regeneration mode and the EV mode.

5. The ignition system of claim 2, wherein the high speed pulser is configured to discharge at least more than 40,000 volts of pulsed power in less than 100 nano-seconds.

6. The ignition system of claim 2, wherein the normal mode includes a cold start of the engine and a middle to a high engine load, which operate by combusting the mixture of fuel and air with a lower ratio than the lean air/fuel ratio.

7. An engine comprising:
   an engine block defining a cylinder;
   a cylinder head configured to cover the cylinder;
   a combustion chamber defined at least partially by the cylinder of the engine block and the cylinder head;
   an injector configured to inject fuel in the cylinder;
   an ignition system including: a spark plug configured to ignite a mixture of fuel and air in a normal mode of the engine, and a high speed pulser configured to ignite the mixture of fuel and air in a lean-burn mode of the engine, wherein in the lean-burn mode, the mixture of fuel and air is mixed at a lean air/fuel ratio;
   a piston reciprocally disposed within the cylinder and configured to move upward to compress the mixture of fuel and air during a compression stroke of the engine; and
   an engine control unit (ECU) configured to:
      determine the normal and lean-burn modes based on an engine speed and an engine load, and
      control the high speed pulser and the spark plug based on a determined mode among the normal mode and the lean-burn mode.

8. The engine of claim 7, wherein the injector, the spark plug and the high speed pulser are disposed in the cylinder of the engine.

9. The engine of claim 8, wherein the spark plug and the high speed pulser are both exposed to the combustion chamber and configured to respectively ignite the mixture of fuel and air, and the mixture of fuel and air having the lean air/fuel ratio in the combustion chamber.

10. The engine of claim 9, wherein the high speed pulser is configured to generate a non-thermal plasma in the combustion chamber, promote a generation of free radicals, and generate multi point volumetric combustion in the lean-burn mode.

11. The engine of claim 9, wherein the ECU is configured to determine the normal mode when the engine is in a cold start state or when the engine load is in a range of a middle to a high engine load, and determine the lean-burn mode when the engine operates at a low engine load.

12. A method for controlling combustion in a lean-burn engine, comprising:
   providing the lean-burn engine including a combustion chamber, the combustion chamber having a spark igniter and a high speed pulser;
   providing a air/fuel mixture to the combustion chamber in a normal engine mode in which the lean-burn engine operates with spark ignition at middle and high engine loads utilizing the spark igniter;
   providing a lean air/fuel mixture to the combustion chamber in a lean-burn engine mode in which the lean-burn engine operates with a multipoint volumetric combustion in the combustion chamber utilizing the high speed pulser; and in the lean-burn engine mode, igniting the lean air/fuel mixture by the high speed pulser to generate a non-thermal plasma in the combustion chamber and promote multi point volumetric combustion of the lean air/fuel mixture.

13. The method of claim 12, wherein the lean air/fuel mixture has a Lambda ($\lambda$) value greater than 1.4.

14. The method of claim 13, further comprising:
determining the lean-burn engine mode when the lean-burn engine operates at a low engine load;
determining the normal engine mode when the lean-burn engine is in a cold start state or operates in a range of the middle to high engine loads; and
transitioning from the lean-burn engine mode to the normal engine mode upon receiving an acceleration input.

\* \* \* \* \*